April 1, 1941. G. D'AGOSTINO 2,237,210
LAWN MOWER
Filed April 4, 1940 2 Sheets-Sheet 1

Inventor
G. D'Agostino
By L. F. Randolph
Attorney

April 1, 1941.   G. D'AGOSTINO   2,237,210
LAWN MOWER
Filed April 4, 1940   2 Sheets-Sheet 2

Inventor
G. D'Agostino
By R. F. Randolph
Attorney

Patented Apr. 1, 1941

2,237,210

UNITED STATES PATENT OFFICE 2,237,210

LAWN MOWER

Giuseppe D'Agostino, Utica, N. Y.

Application April 4, 1940, Serial No. 327,853

6 Claims. (Cl. 56—246)

This invention relates to an improved construction of lawn mower particularly designed and adapted for cutting grass at a plurality of heights by means of a readily adjustable feature, forming a part of the mower, and having novel means for cutting the grass including a stationary cutting knife and an oscillating cutting knife for coacting therewith to produce a searing cut.

Still another object of the invention is to provide an improved type of lawn mower capable of being operated with the minimum of power and so constructed that the cutting element thereof may be readily removed for replacement, repair or sharpening.

Still another aim of the invention is to provide a lawn mower of simple construction capable of being economically manufactured, and constructed of few parts so designed and associated as to provide the maximum of durability.

Other objects and advantages of the invention will hereinafter become more fully apparent from the following description of the drawings, which illustrate a preferred embodiment thereof, and wherein.

Figure 1:
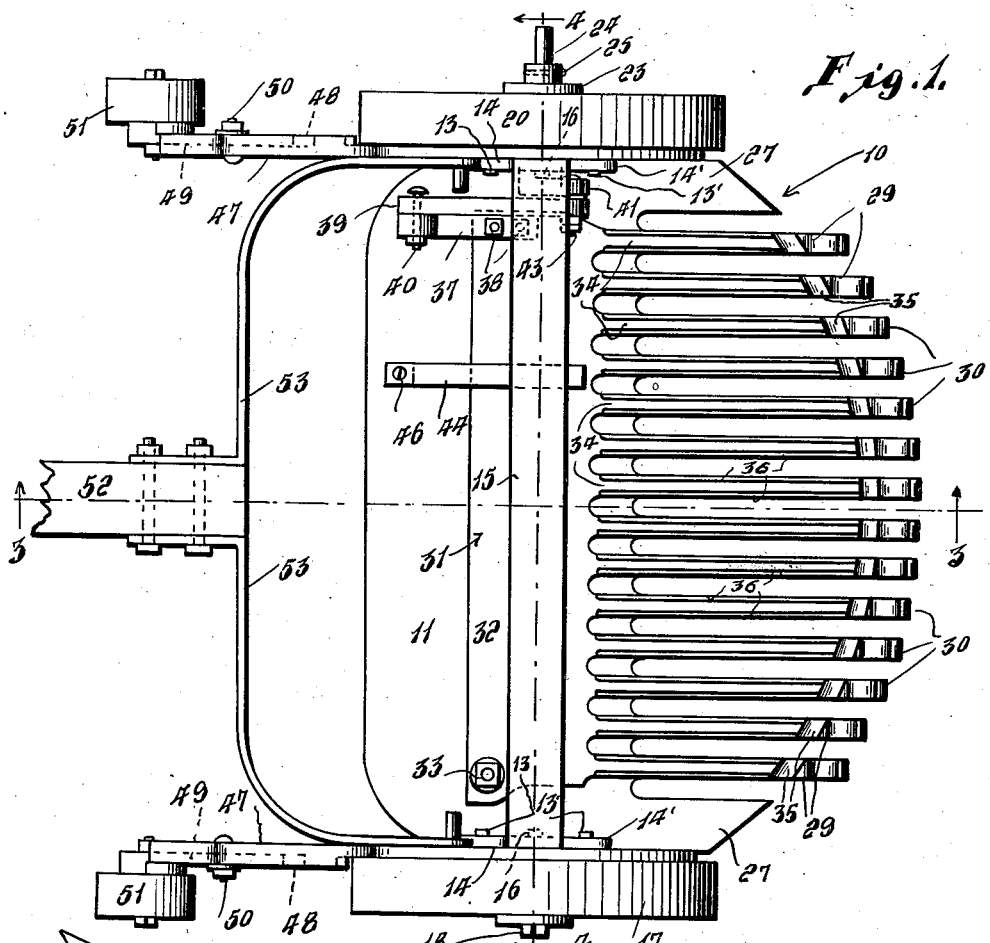
Figure 1 is a top plan view of the mower.
Figure 2:
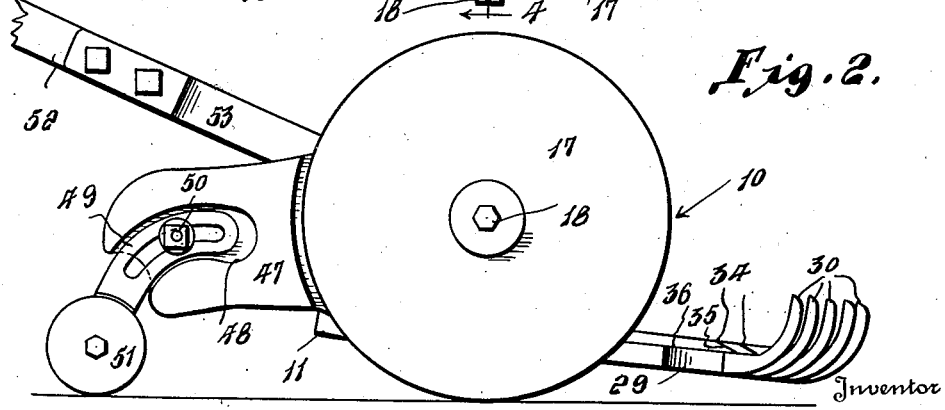
Figure 2 is a side elevational view of the same.
Figure 3:
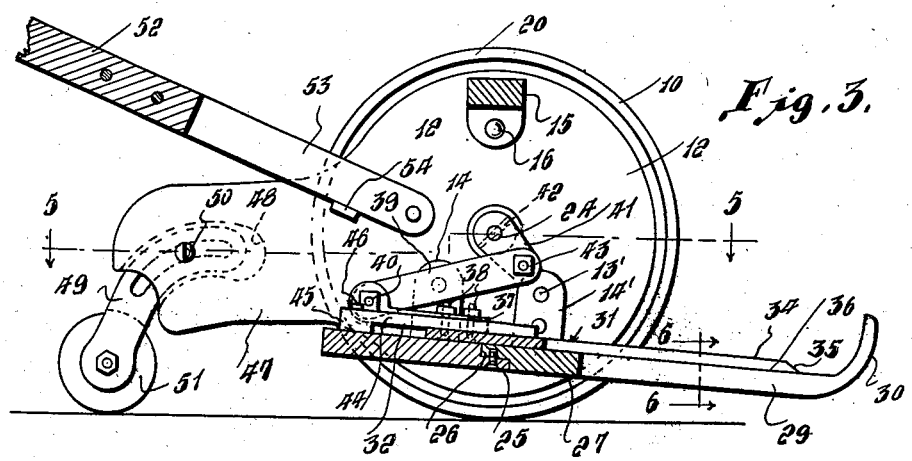
Figure 4:
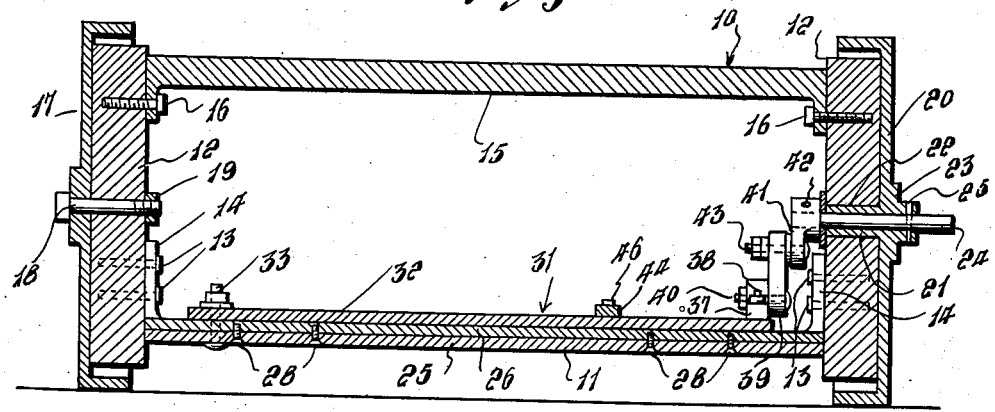
Figures 5, 6:
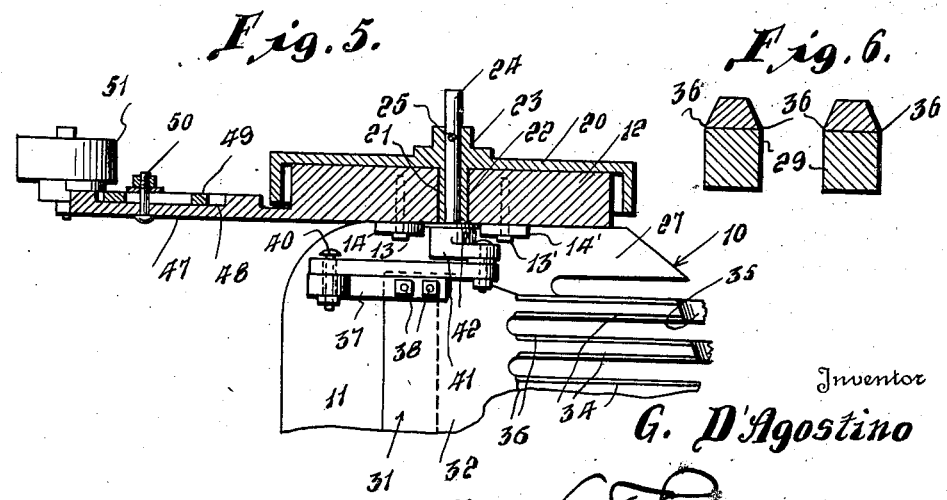

Figure 3 is a longitudinal vertical sectional view taken substantially along the plane of the line 3—3 of Figure 1, Figure 4 is a transverse vertical sectional view taken substantially along the plane of the line 4—4 of Figure 1, Figure 5 is a longitudinal horizontal sectional view taken substantially along the plane of the line 5—5 of Figure 3, and Figure 6 is a cross sectional view taken substantially along the plane of the line 6—6 of Figure 3.

Referring more particularly to the drawings, wherein like reference characters designate like or corresponding parts throughout the different views, 10 designates generally a lawn mower constructed in accordance with the invention and including a frame having a base plate 11 provided with disk members 12 at the ends thereof which are secured thereto by means of fastenings 13 which extend through apertures in upset ears 14 which are disposed at the ends of the plate 11 and in abutting engagement with the inner sides of the disks 12. Plate 11 is disposed adjacent the bottoms of the disks 12 and a spacing bar 15 is connected to the disks adjacent their top portions by fastenings 16, to maintain the disks in an upright position.

A ground wheel 17 is journaled on the shank of a headed bolt which extends axially through one of the disk members 12 and is connected thereto by a nut 19, mounted on the threaded free end of said shank, as best seen in Figure 4, to mount the wheel 17 for rotation around the aforementioned disk 12. A second ground wheel 20 is provided with an integral inwardly projecting sleeve 21, which is journaled in a bearing portion 22 in the center of the other disk member 12 to thereby rotatably mount the wheel 20 thereon. Wheel 20, on its outer side, is provided with an integral hub 23 having a bore aligning with the bore of the sleeve 21, and through which extends a shaft 24 which is keyed to the wheel 20 by means of a pin 25 which extends through the hub 23 and through the shaft 24.

As best seen in Figure 3, the forward edge of the base portion 11 is provided with a flange 25 offset downwardly from its upper surface to engage an overlapping flange 26 formed integral with the rear edge of a stationary cutting blade 27 and offset upwardly from the bottom edge thereof so that the top and bottom surfaces of the base 11 and blade 27 are disposed in substantially the same plane. The stationary blade 27 is detachably connected to the base 11 by means of a plurality of threaded fastenings 28, as best seen in Figure 4. Blade 27 is also detachably connected to the disks 12 by means of fastenings 13' which are connected to the upset ears 14' which are carried by the ends of the blade 27. Blade 27 is provided with a plurality of equally spaced forwardly extending teeth 29 having upturned forward ends forming guards 30. As best seen in Figure 1, the guards 30 combine to form a convex arc.

A movable cutting blade 31 is disposed on the base portion 11 and the cutting blade 27 and includes a head portion 32 which is pivotally connected at one end to the base 11 by means of a bolt 33. Head 32 is provided with the spaced forwardly extending teeth 34, the free ends of which terminate substantially behind the guard portions 30 and concentric therewith when the blade 31 is in a partially projected position, as seen in Figure 1, and as will hereinafter become more fully apparent. As seen in Figure 6, teeth 29 and 34 are relatively wide and relatively thick.

As best seen in Figure 1, the forward ends of the teeth 34 are beveled on their upper sides at 35; and as best seen in Figure 6, the sides of each of the teeth 34 are inclined upwardly and inwardly relatively to each other to form lower sharpened side edges 36, which are adapted to coact with the upper side edges of the teeth 29, as will hereinafter be explained. A bar 37 is fixed to the free end of the head 32 by the fastenings 38 and extends rearwardly therefrom. A link 39 is pivotally connected to the free end of the bar 37 by means of a bolt 40. A crank 41 is keyed to the inner end of the shaft 24 by a pin 42. The opposite end of the link 39 is pivotally connected to the free end of the crank 41 by the bolt 43 so that the free end of the blade 31 is operably connected to the ground wheel 20 to be oscillated when said wheel is revolved.

A bar 44 is provided with an enlarged end 45 which is connected to the base 11 by means of a fastening 46 to dispose the bar in an elevated position relatively to the base. Bar 44 extends forwardly and is disposed over the head 32, adjacent its free end, to prevent said end from raising upwardly out of contact with the stationary jaw 27 while in motion.

Disks 12 are provided with rearwardly projecting extensions 47 provided with arcuately shaped grooves 48 for receiving the slotted ends of arcuately shaped bars 49 which are adjustably connected thereto by means of the fastenings 50 which extend through the grooved portions of the extensions 47 to provide an adjustable connection whereby the bars 49 may be adjustably secured relatively to the lawn mower frame. Casters or rollers 51 are rotatably connected to the free ends of the bars 49, behind the wheels 17 and 20, to combine therewith in supporting the lawn mower 10 and it will be obvious that by extending the bars 49 relatively to the portions 47, the frame of the lawn mower may be tilted forward or by retracting the bars 49 said frame may be tilted rearwardly to lower or raise, respectively, the teeth 29 and 34 to vary the elevation at which the lawn mower will cut. Obviously, if desired, a long roller may be substituted for the rollers 51 which will extend the length of the space between the bars 49.

The lawn mower 10 is adapted to be operated manually and is provided with a conventional handle, a portion of which is shown at 52, which is connected to the inner sides of the disks 12 by the arms 53 and which is supported in an upwardly inclined position relatively to the lawn mower frame by the stops 54.

From the foregoing it will be seen that when the lawn mower 10 is moved the ground wheels 17 and 20 will be revolved. Rotation of the ground wheel 20 will revolve the shaft 24 and the crank 41 to impart a reciprocating oscillating motion to the free end of the blade 31 through the link and bar connection 39 and 37, respectively. The blade 31 will pivot on the bolt 33 to cause the free end of the blade to swing through an arc back and forth relatively to the base 11 and the stationary blade 27 so that the teeth 34 will move back and forth across the upper sides of the teeth 29. The sharpened edges 36 will thus execute a shearing cut with the upper side edges of the teeth 29 on both the forward and back swing of the blade 31 to effectively cut the grass, not shown, which is directed between the teeth as the mower 10 moves forward. The guard portions 30 will protect the teeth 29 and 34 from obstructions such as roots, stones, curbing and the like which will be engaged by the upwardly inclined portions 30 to lift the blades 27 and 31 thereover. Means for varying the elevation of the cutting blade and for retaining the free end of the blade 31 in contact with the blade 27, having been previously described, a further description of the function of these parts is deemed unnecessary.

Various modifications and changes are contemplated and may obviously be resorted to as only a preferred embodiment of the invention has been disclosed.

I claim as my invention:

1. A lawn mower comprising an elongated base member having upright disk portions at the ends thereof, ground wheels rotatably mounted on said disk portions, a stationary knife detachably secured to the forward edge of said base member and extending forwardly therefrom, said knife being provided with a series of forwardly extending guard teeth, a movable knife disposed on said base member and stationary knife and pivotally connected at one end to an end of said base member and extending substantially to the opposite end thereof, and means connecting the opposite end of said movable knife to one of said ground wheels for oscillating said last mentioned end when said ground wheel is revolved, said movable knife being provided at its forward, leading edge with forwardly extending teeth having sharpened side edges for coacting with the teeth of said stationary knife.

2. A lawn mower comprising a frame including a plate portion, ground wheels rotatably mounted on the ends of said frame, a stationary blade detachably mounted on the forward edge of said plate portion and projecting forwardly therefrom, an oscillating blade disposed on said plate portion and stationary blade and pivotally connected at one end to the complementary end of said plate portion, and means for connecting the opposite end of said oscillating blade to one of the ground wheels of the lawn mower, adjacent the opposite end of the plate portion, for oscillating the last mentioned blade when said wheel is revolved, said means comprising a shaft journaled in said frame and keyed to said last mentioned ground wheel, a crank secured to said shaft, and a link pivotally connected at one end to said crank and at its opposite end to the last mentioned end of said reciprocating blade.

3. In a lawn mower, a frame including a substantially flat base having disk portions at its ends, ground wheels rotatably mounted on said disk portions, a stationary cutting blade detachably secured to the forward end of said base and projecting forwardly therefrom, said blade being provided with a convex forward edge comprising spaced longitudinal teeth having upturned free ends forming guard portions, a movable blade mounted on said base and stationary blade and pivotally connected at one end to the base, said movable blade having forwardly extending spaced teeth provided with sharpened side edges for coacting with the side edges of said first mentioned teeth, an axle keyed to one of said ground wheels, a crank keyed to said axle, and a link pivotally connected to the crank and to the free end of said movable blade to oscillate the movable blade when said ground wheel is rotated.

4. A lawn mower as in claim 3, comprising a bar fixed at one end to the upper side of said base and having an upwardly offset forwardly projecting portion disposed over said movable blade, adjacent its free end, for retaining said end in engagement with the stationary blade.

5. A lawn mower as in claim 3, said disk portions having rearwardly extending projections, slotted arcuately shaped bars adjustably secured to said extensions and extending downwardly therefrom, casters journaled on the lower ends of said bars for angularly adjusting the frame and for adjusting the elevation of the teeth of the cutting blade.

6. A lawn mower comprising an elongated stationary blade having cutting teeth projecting from one longitudinal edge thereof, a cutting blade pivotally connected at one end to the complementary end of the stationary blade, and disposed thereon, said cutting blade having cutting teeth disposed over the teeth of the first mentioned blade to co-act therewith, a ground wheel rotatably connected to the opposite end of the stationary blade, a crank connected to the ground wheel, and link means connecting the crank to the free end of the cutting blade for oscillating the cutting blade when the ground wheel is revolved, said blades being disposed transversely to the direction of movement of the mower and said teeth being disposed at the leading edges thereof.

GIUSEPPE D'AGOSTINO.